United States Patent [19]

Wagner

[11] Patent Number: 4,487,305

[45] Date of Patent: Dec. 11, 1984

[54] APPARATUS, ESPECIALLY PORTABLE APPARATUS, FOR HANDLING TUBULAR- AND/OR ROD-SHAPED WORKPIECES OR THE LIKE

[75] Inventor: Rudolf Wagner, Stuttgart, Fed. Rep. of Germany

[73] Assignee: REMS-WERK Christian Föll und Söhne GmbH & Co., Waiblingen, Fed. Rep. of Germany

[21] Appl. No.: 333,288

[22] Filed: Dec. 22, 1981

[30] Foreign Application Priority Data

Dec. 24, 1980 [DE] Fed. Rep. of Germany ....... 3049136
Mar. 7, 1981 [DE] Fed. Rep. of Germany ....... 3108692

[51] Int. Cl.³ .......................... H01H 3/14; G05G 1/14
[52] U.S. Cl. ............... 192/129 A; 10/129 P; 200/86.5; 74/512; 74/560
[58] Field of Search ........ 192/129 A, 131 H; 10/129 P; 200/86.5, 153 C; 74/512, 560

[56] References Cited

U.S. PATENT DOCUMENTS

| | | | |
|---|---|---|---|
| 2,375,707 | 5/1945 | Speller | 192/129 A X |
| 2,535,021 | 12/1950 | Stone et al. | 200/153 C X |
| 2,644,868 | 7/1953 | Locey | 200/86.5 |
| 2,713,407 | 7/1945 | Miller | 192/129 A |
| 2,944,120 | 7/1960 | Ruben | 200/86.5 X |
| 3,467,798 | 9/1969 | Kreeger | 200/86.5 |
| 3,637,964 | 1/1972 | Ivko | 200/86.5 |
| 3,833,782 | 9/1974 | Bartel | 200/86.5 |
| 3,858,095 | 12/1974 | Friemann et al. | 192/129 A |
| 3,963,890 | 6/1976 | Strailhammer | 200/86.5 |
| 4,010,679 | 3/1977 | Dybell | 192/129 A |
| 4,075,961 | 2/1978 | Harris | 192/129 A X |
| 4,095,123 | 6/1978 | Takahashi | 200/86.5 X |
| 4,267,414 | 5/1981 | Brueggeman | 200/86.5 |
| 4,283,612 | 8/1981 | Richards | 200/153 C X |
| 4,374,309 | 2/1983 | Walton | 192/129 A X |

FOREIGN PATENT DOCUMENTS

| | | | |
|---|---|---|---|
| 1258279 | 12/1971 | United Kingdom | 192/129 A |
| 1530588 | 11/1978 | United Kingdom | 200/86.5 |

Primary Examiner—Rodney H. Bonck
Assistant Examiner—David D. House
Attorney, Agent, or Firm—Becker & Becker, Inc.

[57] ABSTRACT

An apparatus is provided for machining tubular and/or rod-shaped workpieces. The apparatus has a rotational drive or motor for the workpieces to be machined. A switching device, which is accommodated in, and actuated by, a foot pedal, is connected to the rotational drive. The foot pedal is provided with a restart arrestor, and/or an emergency shutoff device to provide protection against unintended restarting of the apparatus after a power failure, or to instantaneously disconnect the apparatus from the electric circuit in case of danger.

17 Claims, 10 Drawing Figures

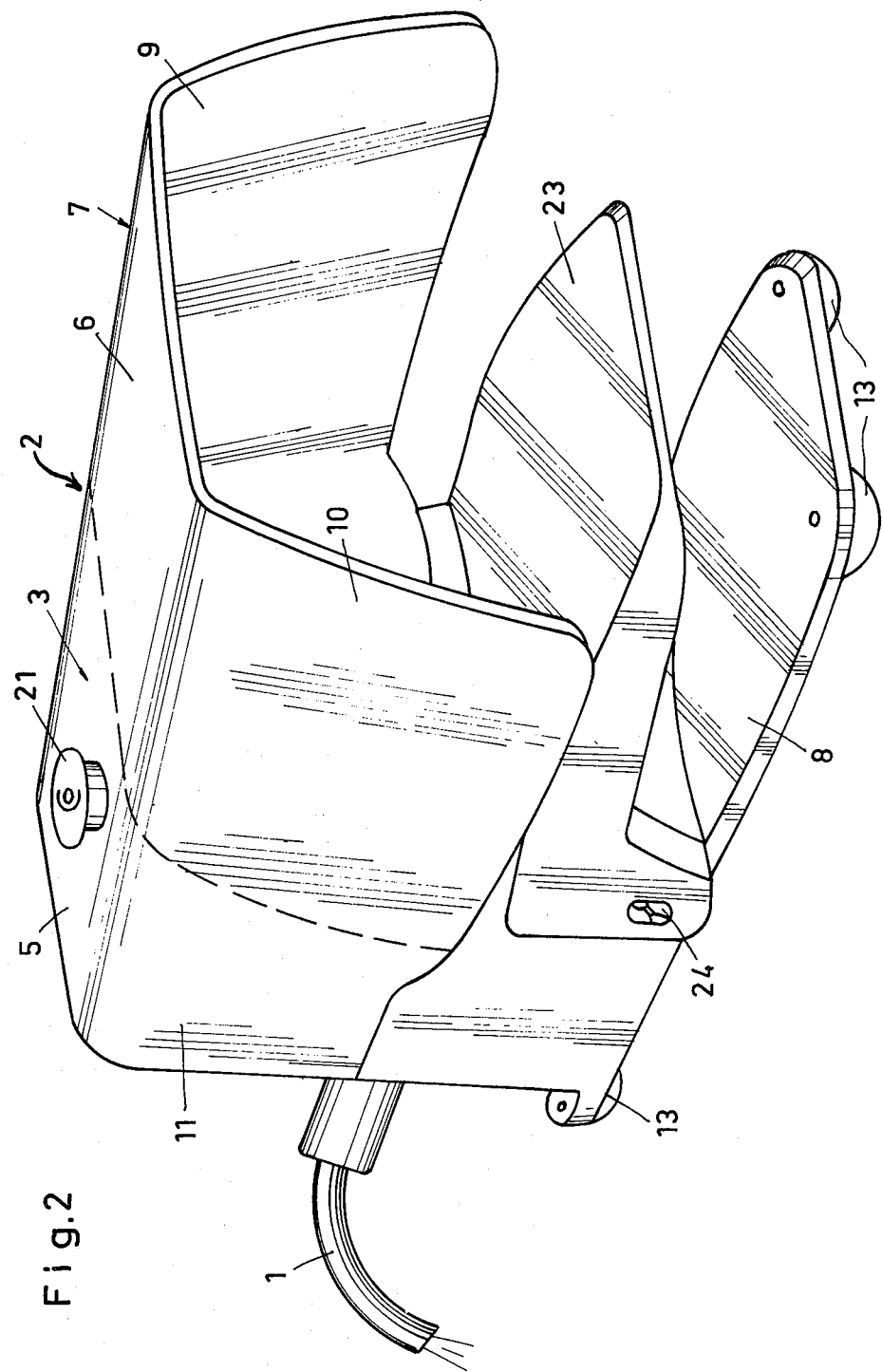

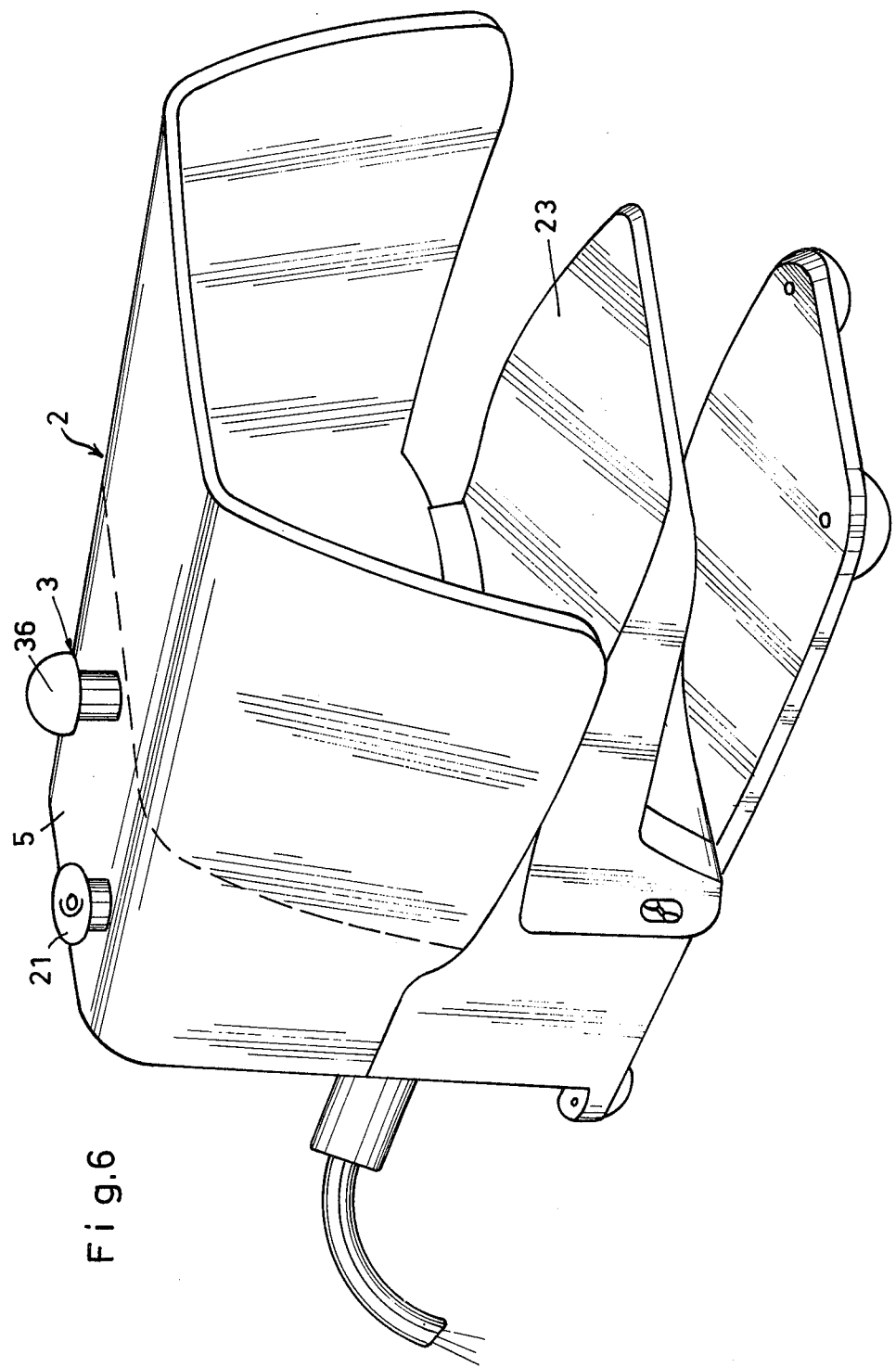

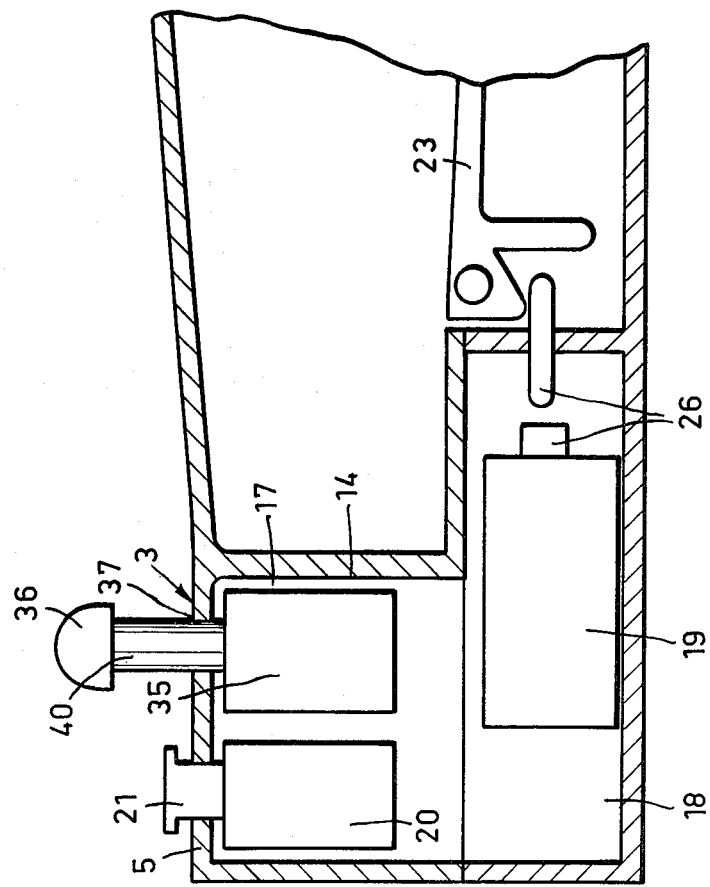
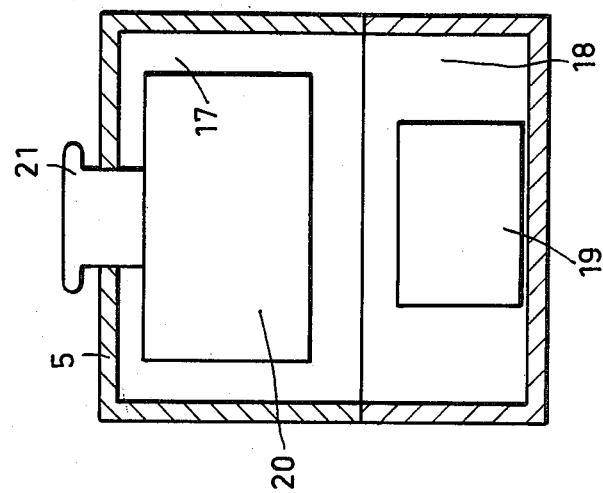

APPARATUS, ESPECIALLY PORTABLE APPARATUS, FOR HANDLING TUBULAR- AND/OR ROD-SHAPED WORKPIECES OR THE LIKE

The present invention relates to an apparatus, especially a portable apparatus, such as a thread-cutting machine, for handling or machining tubular- and/or rod-shaped workpieces or the like. The apparatus has a rotational drive and a switching device for the rotational drive; the switching device is accommodated in a foot pedal which is provided with a foot lever for actuating the switching device.

This known apparatus is a portable thread-cutting machine, the rotational drive of which is turned on, by actuating the foot lever, to rotate the workpieces to be machined about their axes. When, for example after a power failure, the electric circuit is connected again, the rotational drive of this apparatus can unintentionally start again.

It is known with machines having protective control to install for example switch protection with self-holding means which drop out during power failure, so that after switching on the electric circuit, the machine does not start again. Such switch protection means however have relatively large dimensions, and are therefore especially unsuitable for portable devices which have no space available for such large additional parts. The installation of such switch protection would also require considerable modification of the apparatus.

It is an object of the present invention to embody an apparatus of the aforementioned type in such a way that in the event of a problem or danger, the apparatus itself does not become a source of danger to the operator, and to do so without requiring extensive modification of the apparatus.

This object, and other objects and advantages of the present invention, will appear more clearly from the following specification in connection with the accompanying drawings, in which:

FIG. 2 is a perspective and enlarged illustration of the foot pedal of the inventive apparatus;

FIG. 6 is a perspective illustration of a second embodiment of the foot pedal of an inventive apparatus;

FIG. 7 is a schematic illustration in longitudinal section through a part of the foot pedal of FIG. 6;

FIG. 8 is a transverse section through the foot pedal of FIG. 6 in the region of a receiving chamber for the emergency shutoff device;

Figure 1:
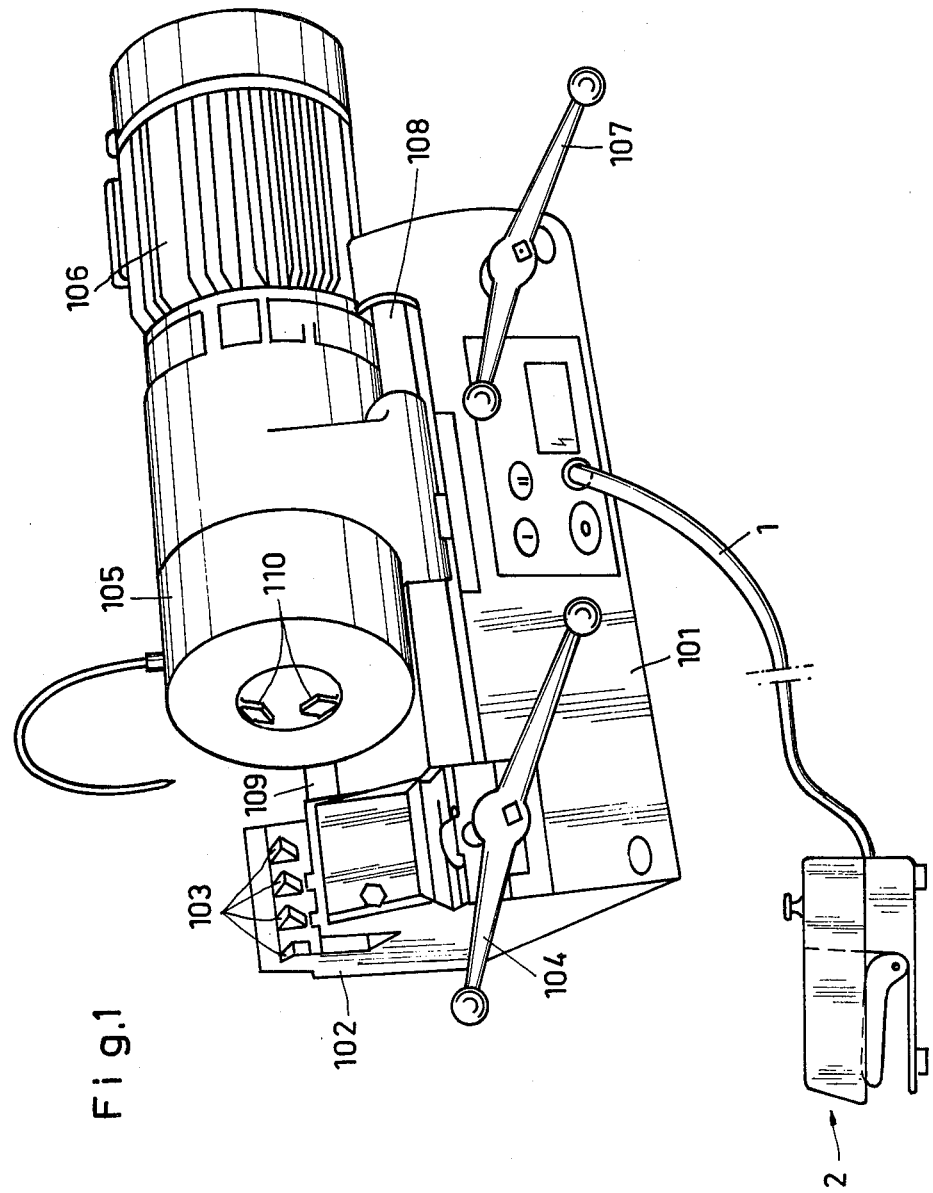
FIG. 1 is a diagrammatic perspective view of one embodiment of an apparatus having a foot pedal in accordance with the present invention.

The apparatus of the present invention is characterized primarily by either providing the foot pedal with an emergency shutoff device which has an operating element, or with a restart arrestor against unintentional restarting following correction of a power failure.

When the rotational drive is turned on and the power fails, the rotational drive is also shut off. With the second alternative mentioned above, the restart arrestor prevents the apparatus from being turned on after elimination of the operating problem and connection of the electric circuit. The operator of the apparatus must first actuate the restart arrestor, so that the circuit of the switching device is closed. Since the restart arrestor is provided at the foot switch, the apparatus itself need not be modified. Consequently, apparatus already being used can also be subsequently equipped with such a restart arrestor in accordance with the present invention.

By providing the foot pedal with an emergency shutoff device according to the first mentioned alternative of the present invention, the emergency shutoff device can be actuated in an emergency situation by the operating element, so that the apparatus is disconnected from the power supply, and the rotational drive is instantaneously turned off. Even if the switching device of the apparatus is actuated by the foot pedal, the rotational drive cannot be turned on. In order to restart the apparatus, the emergency shutoff device must again be switched on. The emergency shutoff device is provided at the foot pedal, so that a modification of that part of the apparatus provided with the rotational drive is not necessary. Consequently, apparatus already being used but not equipped with an emergency shutoff device can very easily be subsequently provided with such an emergency shutoff device. It is merely necessary to disconnect the connecting cable provided with the foot pedal, and to connect the connecting cable of the foot pedal of the present invention.

According to further features of the present invention, the restart arrestor may be accommodated in the foot pedal. More specifically, the restart arrestor and the switching device may be accommodated in a common housing, with the restart arrestor preferably being arranged above the switching device. The restart arrestor and the switching device may be accommodated in separate receiving chambers which preferably merge with one another; preferably, the lower receiving chamber, viewed in the longitudinal direction of the foot pedal, extends beyond the upper receiving chamber.

The restart arrestor may be separated from the foot lever by an end wall of the housing; this wall preferably separates the upper receiving chamber from the foot lever, and is provided at approximately half the length of the lower receiving chamber; this end wall extends from an upper wall of the housing and terminates at a distance from a bottom part of the foot pedal.

The restart arrestor may have a release button which is shiftable against spring force for switching-on the restart arrestor; the release button may project outwardly through the housing.

An upper wall may be connected to the end wall and may extend in the longitudinal direction of the foot pedal and partially close off the top of the lower receiving chamber; this upper wall preferably lies externally of the upper receiving chamber, and may be connected with the bottom part by another end wall.

The restart arrestor may have a relay with a self-holding circuit which lies in the circuit of the switching device.

With the embodiment in which the foot pedal is provided with an emergency shutoff device having an operating element, the emergency shutoff device may be accommodated in the foot pedal, and the operating element may be actuated from the outside. The emergency shutoff device and the switching device may be accommodated in a common housing, with the emergency shutoff device being arranged above the switching device. The emergency shutoff device may be separated from the foot lever by a wall of the housing. The emergency shutoff device and the switching device may be accommodated in separate receiving chambers of the housing. The emergency shutoff device and the restart arrestor may be accommmodated in a common receiving chamber of the housing.

Referring now to the drawings in detail, the apparatus shown is a portable external-thread-cutting machine for tubular and/or rod-shaped workpieces or the like. The apparatus has a base 101 upon which is arranged a chuck 102, the clamping jaws 103 of which securely grip the workpiece to be machined. The chuck 102 is provided with a rotatable clamping lever 104 to effect clamping. A cutting head 105 is mounted axially shiftable on the base 101; this cutting head 105 is rotatably driven by a motor 106. A rotatable feed lever 107 is provided to axially shift the cutting head 105 on two guides 108, 109 on the base 101. The cutting head 105 is provided with radially displaceable cutting jaws 110 with which a thread can be cut on the workpiece.

Figure 3:
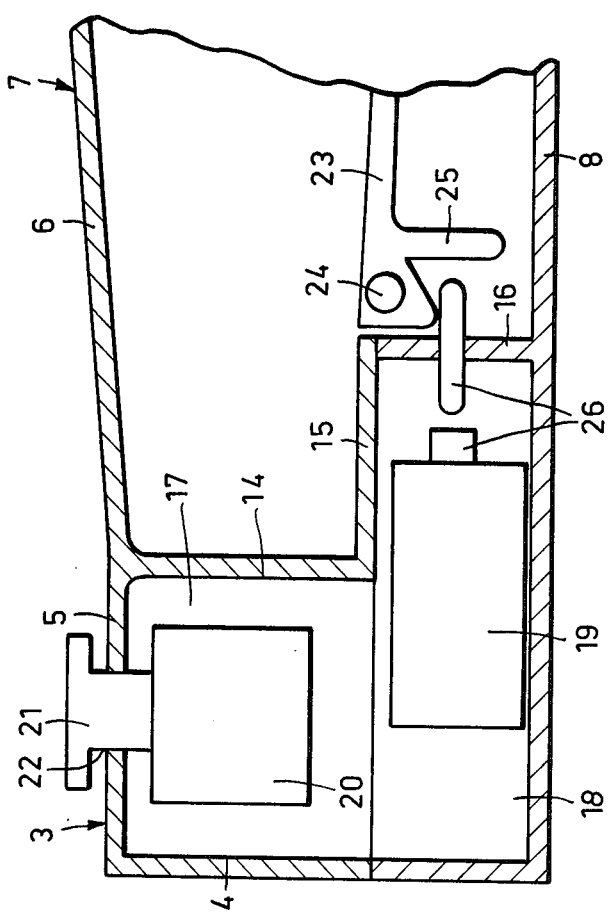
FIG. 3 is a schematic illustration in longitudinal section through a part of the foot pedal of FIG. 2.

The thread-cutting machine is electrically connected to a foot switch or pedal 2 by a connecting cable 1, as shown in FIG. 1. The foot pedal 2 has a housing 3 which extends over the entire height of the foot pedal 2 and is preferably made of synthetic plastic material. As shown in FIG. 3, the housing 3 has an end wall or front plate 4 which extends over the entire height of the foot pedal and is disposed transverse to the longitudinal median plane of the foot pedal. The upper end of the end or front wall 4 merges approximately at right angles with an upper wall 5 of the housing; this wall 5 continues into an upper wall 6 of a hood 7. The upper wall 5 has a rectangular outline or contour, with the longer sides extending transverse to the longitudinal median plane of the foot pedal 2. The upper wall 6 of the hood 7 extends from the housing 3 towards its free end with a slight rise, so that the upper wall 6, as viewed in the direction towards its free end, has an increasing spacing from the bottom part 8 of the foot pedal 2. As shown in FIG. 2, the hood 7 has a U-shaped cross section, and has sides 9, 10 which diverge from the upper wall 6 and terminate at a distance above the bottom part 8. The height of the sides 9, 10 is slightly greater than the greatest half-height of the foot pedal 2. The sides 9,10 have a curved transition into the upper wall 6 of the hood 7. Additionally, the sides 9,10 converge from their free ends toward the housing 3, and have a curved transition into the sidewalls 11, 12 of the housing 3, which sidewalls 11, 12 are parallel to each other and approximately at right angles to the end wall 4. The side walls 11, 12 are additionally connected approximately at right angles with the bottom part 8, which has a rectangular outline or contour, and the underside of which is provided with feet 13 in the vicinity of the corners thereof. The bottom part 8 terminates with the end wall 4 and the sidewalls 11, 12, and extends approximately as far as does the free end of the hood 7. A further end wall 14 is located across from the end wall 4, as can be seen in FIG. 3. This end wall 14 is parallel to the end wall 4 as well as at right angles to the upper wall 5 of the housing 3, and extends over a little more than half the height of the foot pedal 2. An upper wall 15 is connected at right angles to that end of the end wall 14 remote from the upper wall 5. This wall 15 extends from the end wall 14 toward the free end of the hood 7, and is nearly parallel to the bottom part 8. The upper wall 15 is connected with the bottom part 8 by an end wall 16 which is connected with the wall 15 at right angles. The distance between the two end walls 4 and 14 corresponds to approximately ⅓ to ¼ of the length of the foot pedal 2. The length of the upper wall 15, measured in the longitudinal direction of the foot pedal 2, likewise corresponds to approximately ⅓ to ¼ of the overall length of the foot pedal 2. The height of the end wall 16 is slightly less than the length of the foot pedal 2 measured at this location. The end wall 14, the upper wall 15, and the end wall 16 connect the sidewalls 11, 12, which are located across from each other, so that a high rigidity of shape is attained.

The housing 3 is delimited by the end walls 4 and 14, the upper walls 5 and 15, the sidewalls 11, 12, a portion of the bottom part 8, and the end wall 16. The end wall 14 additionally forms an end wall of the hood 7. As a result of the described configuration of the housing 3, two oppositely located receiving chambers 17, 18 are formed which respectively extend over the entire width of the foot pedal 2. The upper receiving chamber 17 is only approximately half as long as the lower receiving chamber 18 when viewed in the longitudinal direction of the foot pedal 2, and the height of the receiving chamber 18 is slightly less than the height of the upper receiving chamber 17; the chamber 18 extends into the region of the hood 7. A very compact construction of the foot pedal 2 is attained as a result of this divided housing.

A switching device 19 is installed in the lower receiving chamber 18, and is connected with the connecting cable 1. A restart arrestor or blocking means 20 is arranged in the upper receiving chamber 17, and is provided with a release button 21 which projects outwardly through an opening 22 in the upper wall 5 of the housing 3. The release button 21 can be pressed against spring force. The end wall 4 has an opening for the connecting cable 1 in the region of the lower receiving chamber 18.

A foot lever 23 for actuating the switching device 19 is pivotally mounted on a bearing bolt 24 against spring force in the region below the hood 7. The foot lever 23 is plate-shaped and has on its underside a projection 25 which actuates a switch 26 of the switching device 19 when the foot lever 23 is pressed down against spring force. The U-shaped configuration of the hood 7, and the converging sides 9, 10 of the hood, assure that the operator can comfortably place a foot on the foot lever 23 below the hood 7 and can actuate the foot lever 23.

The hood 7, the end wall 14, the upper walls 5 and 15, as well as the upper portions of the end wall 4 and the side-walls 11, 12 are made in one piece and are detachably connected with the lower part of the foot pedal 2. The upper portions of the end wall 4 and the sidewalls 11, 12 have the same height as the end wall 14. The lower part of the foot pedal 2 is formed by the bottom part 8, the end wall 16, and the lower portions of the end wall 4 and the sidewalls 11, 12. In the assembled state, the end faces of the lower portions of the end wall 4 and of the sidewalls 11, 12 adjoin the end faces of the upper portions of the end wall and of the sidewalls. The upper wall 15 rests on the end face of the end wall 16 and braces the latter, as apparent from FIG. 3. The foot pedal 2 can be easily opened for repair purposes as a result of the twopart construction and detachable connection of the two parts.

Figure 5:
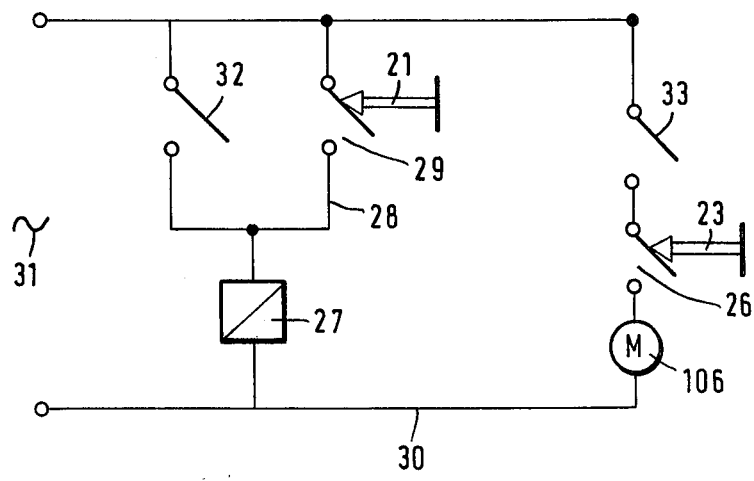
FIG. 5 is a circuit diagram of the switching device and the restart arrestor.

The restart arrestor 20 has a circuit 30 as shown in FIG. 5 including a relay 27 with a self-holding circuit 28 in which is located a switch 29 that is actuated by the release button 21. The switch 26 of the switching device 19 lies in the circuit 30, which is connected to a source of power 31.

In order to actuate the apparatus equipped with the foot pedal 2, the release button 21 of the restart arrestor 20 is first pressed against spring force, thus closing the switch 29 in the self-holding circuit 28. The relay 27 is therefore energized, and the contacts 32, 33 are closed. The switch 29 remains closed as long as the relay 27 is energized. The switch 26 is then actuated to drive the motor 106, whereby the circuit 30 is closed and the motor 106 is turned on.

During a power failure, the relay 27 drops out, so that the contacts 32,33 and the switch 29 are opened, whereby the release button 21 is returned under spring force to its starting position. When the problem is corrected and power is restored, the self-holding circuit 28 and the circuit 30 are opened because of the open contacts 32, 33, so that, when the switch 26 is closed, the motor is not turned on. Only after pressing the release button 21 is the relay 27 energized and the contacts 32, 33 closed again, so that then also the circuit 30 is closed and the motor is turned on.

In the illustrated embodiment, the foot lever 23 with the switch 26 is an on and off switch, i.e. the switch 26 remains closed after one depression of the foot lever 23. The foot lever 23 must then be pressed down again to open the switch 26.

The foot lever 23 can also be a tipping switch which when pressed down closes the switch 26, and when released opens the switch again. The contact 33 is not absolutely necessary with such a construction. In this situation, the circuit 30 is not closed until after the foot lever 23 is pressed. The contact 33 however can also be provided in such a situation for additional safety, so that in any case, after a power failure, the circuit 30 can not be closed again until the restart arrestor 20 is first actuated.

The restart arrestor 20 is easily accommodated in the housing 3 of the foot pedal 2 and wired with the switching device 19. The accommodation in the foot pedal 2 additionally has the great advantage that the manner of protection prescribed for the installation of electrical switching devices can be provided in a simple manner. Additionally, no changes of the apparatus itself are necessary, since the restart arrestor 20 is accommodated in the foot pedal 2. Furthermore, apparatus already being used can very simply be subsequently equipped with the restart arrestor 20. For this purpose, it is only necessary to disconnect the connecting cable already provided with these foot pedals; this can generally be carried out by a layman, i.e. an individual who is not an electrician. The connecting cable 1 is then joined to the completely installed and wired foot pedal, and also to the restart arrestor 20, which is integrated and connected to the foot pedal.

Figure 4:
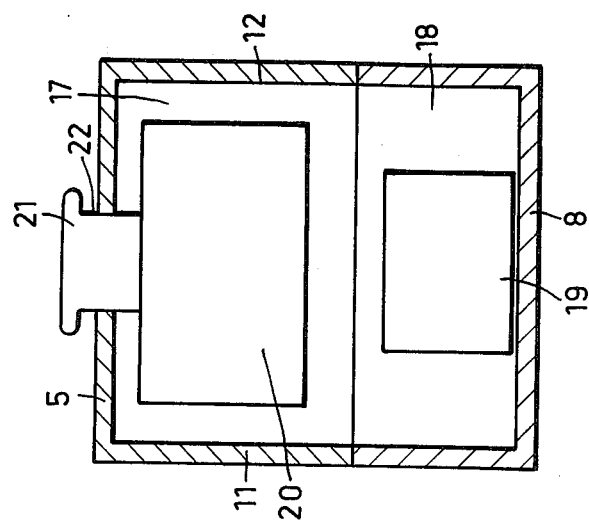
FIG. 4 is a transverse section through the foot pedal in the region of the restart arrestor or blocking means.

The embodiment of a foot pedal illustrated in FIGS. 6 through 8 is very similar to the embodiment of FIGS. 2 through 4. The only difference is that an emergency shutoff device 35 is also arranged in the upper receiving chamber 17 in addition to the restart arrestor 20. This emergency shutoff device 35 is provided with an operating or control element 36, which also projects outwardly through an opening 37 in the upper wall 5 of the housing 3. As shown in FIG. 6, the release button 21 and the operating element 36 in the upper wall 5 of the housing 3 are located diagonally across from each other, resulting in a space-saving arrangement. The release button 21 and the operating element 36 can be pressed against spring force.

Figure 9:
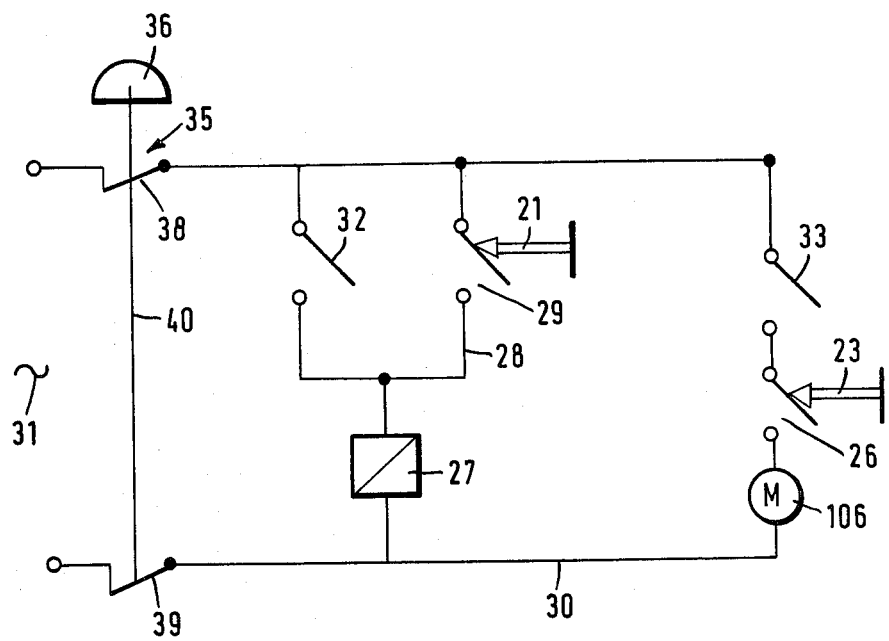
FIG. 9 is a circuit diagram with an emergency shutoff device, a restart arrestor, and a switching device for the rotational drive.

Referring now to FIG. 9, the emergency shutoff device 35, which has two switches 38, 39 which are actuated in common by a plunger or push rod connected with the operating element 36, lie in the circuit 30 of the restart arrestor 20. In order to actuate the apparatus equipped with the foot pedal 2, the release button 21 of the restart arrestor 20 is pressed against spring force, whereby the switch 29 in the self-holding circuit 28 is closed. The relay 27 is therefore energized, and the contacts 32, 33 are closed. As long as the relay 27 is energized, the switch 29 remains closed. The switches 38, 39 of the emergency shutoff device 35 are likewise closed. To drive the motor 106 of the apparatus, the switch 26 is actuated by pivoting the foot lever 23, whereby the circuit 30 is closed and the motor 106 is turned on.

So that the apparatus can be instantaneously disconnected from the electric circuit in case of danger, such as when the clothing of the operator catches in a thread-cutting machine, the plunger 40 is pressed by the operating element 36, whereby the switches 38, 39 are opened. As a result, the circuit 30 is interrupted, so that the motor 106 is immediately turned off. The relay 27 also drops out when the operating element 36 is pressed, so that the contacts 32, 33 and the switch 29 are opened, whereby the release button 21 is returned under spring force to its starting position. The emergency shutoff device 35 must be switched on again when the danger has been eliminated. For this purpose, the plunger 40 can be embodied with the operating element 36 as a mechanical switch which is held in the pressed-in position under spring force, and is held in the pulled-out position by clamping force. When the plunger is pulled-out, the switches 38, 39 are closed. Preferably, the emergency shutoff device 35 is embodied in such a way that the plunger 40 remains in the pressed-in position after it is pressed in, so that the switches 38, 39 can no longer be closed by the plunger 40. The switches 38, 39 are electrically connected with a nonillustrated safety device which is disconnected when the plunger 40 is pressed. This safety device can be arranged on the apparatus itself, or at a location remote from the set-up site of the apparatus. The safety device must be reconnected in order to reconnect the emergency shutoff device 35, whereby the switches 38, 39 are closed, and the plunger 40 is returned to its starting position. Current can then flow again in the circuit 30. The self-holding circuit 28 and the circuit 30 are open because of the open contacts 32, 33, so that, even with a closed switch 26, the motor 106 is not yet turned on. The relay 27 is energized, and the contacts 32, 33 are closed, only after the release button 21 has been pressed, so that then the circuit 30 can also be closed, and the motor 106 can be turned on.

The restart arrestor 20, independent of actuation of the emergency shutoff device 35, safeguards reconnection of the apparatus after a power failure and elimination of the problem. During a power failure, the relay 27 drops out, whereby the contacts 32, 33 and the switch 29 are opened in the manner described above. The switches 38, 39, however, are closed. If the problem is eliminated and current flows again, the motor 106 cannot be turned on again until the release button 21 is pressed, thus energizing the relay 27 and closing the contacts 32, 33 again.

Figure 10:
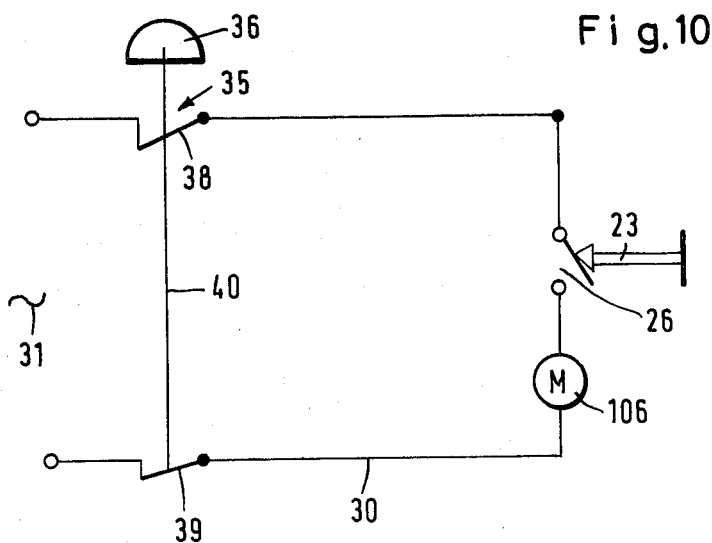
FIG. 10 illustrates a second embodiment of a circuit diagram with an emergency shutoff device and a switching device for the rotational drive.

According to a further embodiment, only the emergency shut-off device 35 is accommodated in the receiving chamber 17 of the housing 3. The apparatus can be disconnected from the circuit in case of danger by this emergency shutoff device 35. As shown in FIG. 10, both switches 38, 39 of the emergency shutoff device 35, as well as the switch 26, which is actuated by the foot lever 23, lie in the circuit 30.

With this embodiment too the circuit 30 is opened, by opening the switches 38, 39, by pressing the plunger 40 by means of the operating element 36, so that the motor 106 is turned off. The switches 38, 39 of the emergency shutoff device 35 must be closed again in the manner described above to turn the apparatus on again. In contrast to the previous embodiment, the switch 26, and hence the circuit 30, can now be closed by the foot lever 23, so that the motor is turned-on.

The foot lever 23 with the switch 26 is an on-and-off switch in both of the previously described embodiments, so that the switch 26 remains closed after one depression or pressing-down of the foot lever. The foot lever must then be pressed again to open the switch 26.

The foot lever can also be a tipped switch which when pressed down closes the switch 26, and when released opens the switch again. The contact 33 is not absolutely necessary with the embodiment of FIGS. 6 through 9. In this situation, the switch circuit 30 is not closed until the foot lever 23 is pressed. The contact 33 however can also be provided in such a situation for additional safety, so that in any case, after a power failure, the circuit 30 cannot be closed again until the restart arrestor 20 has been actuated.

The restart arrestor and/or the emergency shutoff device 35 are easily accommodated in the housing 3 of the foot pedal 2 and wired with the switch device 19. The accommodation in the foot pedal has the advantage that the manner of protection prescribed for the installation of electrical switching devices can be provided in a simple manner. No changes are necessary on the apparatus itself, since the restart arrestor 20 and/or the emergency shutoff device 35 are accommodated in the foot pedal. Thus, apparatus already being used can very easily subsequently be equipped with such a restart arrestor and/or such an emergency shutoff device. For this purpose, it is only necessary to disconnect the connecting cable already provided with these foot pedals; this can generally be carried out by a layman. The connecting cable 1 is then joined to the completely installed and wired foot pedal and the restart arrestor and/or emergency shutoff device which are integrated and connected to the foot pedal.

With the embodiments according to FIGS. 6 through 10, the apparatus can be instantaneously disconnected from the electric circuit in case of danger either in addition to, or also independent of the presence of a restart arrestor.

In place of a thread-cutting machine, other portable apparatus for machining tubular and/or rod-shaped workpieces or the like, or other electrical tools, can also be equipped with a foot pedal in the manner described above.

The present invention is, of course, in no way restricted to the specific disclosure of the specification and drawings, but also encompasses any modifications within the scope of the appended claims.

What I claim is:

1. An apparatus including a motor subject to interruption of power for handling workpieces that are movable, said apparatus comprising:
   a means for chucking said movable workpieces during machining thereof;
   a switching device operatively associated with the motor;
   a foot pedal, said switching device being accommodated in said foot pedal;
   a foot lever provided in said foot pedal for actuating said switching device; and
   a restart arrestor operatively associated and built-in directly with said foot pedal and said switching device rather than with said apparatus including the motor for preventing unintentional restarting thereof following correction of a power failure.

2. An apparatus according to claim 1, in which said foot pedal includes a housing common to both said restart arrestor and said switching device.

3. An apparatus according to claim 2, in which said restart arrestor is provided with a relay having a self-holding circuit which lies in the circuit of said switching device.

4. An apparatus according to claim 2, in which said restart arrestor in arranged above said switching device.

5. An apparatus according to claim 2, in which said housing includes separate receiving chambers for respectively separately accommodating said restart arrestor and said switching device.

6. An apparatus according to claim 5, in which said receiving chambers merge with one another and are arranged one above the other, with the lower receiving chamber, when viewed in the longitudinal direction of said foot pedal, extending beyond the upper receiving chamber.

7. An apparatus according to claim 6, in which said housing includes a first end wall for separating said restart arrestor from said foot lever; in which said foot pedal includes a bottom part; and in which said housing includes a first upper wall; with said first end wall separating said upper receiving chamber from said foot lever, said first end wall being located at approximately one half the longitudinal dimension of said lower receiving chamber and extending from said first upper wall and terminating at a distance from said bottom part of said foot pedal.

8. An apparatus according to claim 7, in which said restart arrestor is provided with a release button which is displaced against spring force for switching-on said restart arrestor, said release button projecting outwardly through said housing.

9. An apparatus according to claim 8, which includes a second upper wall connected to said first end wall and extending in the longitudinal direction of said foot pedal and partially closing off the top of said lower receiving chamber.

10. An apparatus according to claim 9, in which said second upper wall is located externally of said upper receiving chamber; and which includes a second end wall which interconnects said second upper wall and said bottom part.

11. An apparatus including a motor subject to interruption of power for handling workpieces that are movable, said apparatus comprising in combination:

a means for chucking said movable workpieces during machining thereof;

a switching device operatively associated with the motor;

a foot pedal, said switching device being accommodated in said foot pedal;

a foot lever provided in said foot pedal for actuating said switching device; and an emergency shut-off device operatively associated and built-in directly with said foot pedal and said switching device rather than with said apparatus including the motor for shutting off said apparatus in an emergency, said shut-off device being provided with an operating element and including a switch and circuitry thereof remote from the apparatus itself.

12. An apparatus in combination according to claim 11, in which said emergency shut-off device is accommodated in said foot pedal, and said operating element is actuated from the outside of said foot pedal.

13. An apparatus in combination according to claim 12, in which said foot pedal includes a housing common to both said emergency shut-off device and said switching device.

14. An apparatus in combination according to claim 13, in which said housing includes separate receiving chambers for respectively separately accommodating said emergency shut-off device and said switching device.

15. An apparatus including a motor subject to interruption of power for handling workpieces that are movable, said apparatus comprising:

a means for chucking said movable workpieces during machining thereof;

a switching device operatively associated with the motor;

a foot pedal, said switching device being accommodated in said foot pedal;

a foot lever provided in said foot pedal for actuating said switching device; and an emergency shut-off device operatively associated and built-in directly with said foot pedal and said switching device rather than with said apparatus including the motor for shutting off said apparatus in an emergency, said shut-off device being provided with an operating element, said emergency shut-off device being accommodated in said foot pedal, and said operating element being actuated from the outside of said foot pedal, said foot pedal including a housing common to both said emergency shut-off device and said switching device, said housing including separate receiving chambers for respectively separately accommodating said emergency shut-off device and said switching device, and a restart arrestor operatively associated with said foot pedal and said switching device for preventing unintentional restarting of said apparatus following correction of a power failure, said emergency shut-off device and said restart arrestor being accommodated in a common receiving chamber.

16. An apparatus according to claim 15, in which said emergency shut-off device is arranged above said switching device.

17. An apparatus according to claim 15, in which said housing includes a wall for separating said emergency shut-off device from said foot lever.

* * * * *